L. DION.
APPARATUS FOR RECOVERING METALS FROM ORES AND OTHER SUBSTANCES.
APPLICATION FILED MAR. 4, 1904.
925,626.
Patented June 22, 1909.
2 SHEETS—SHEET 1.
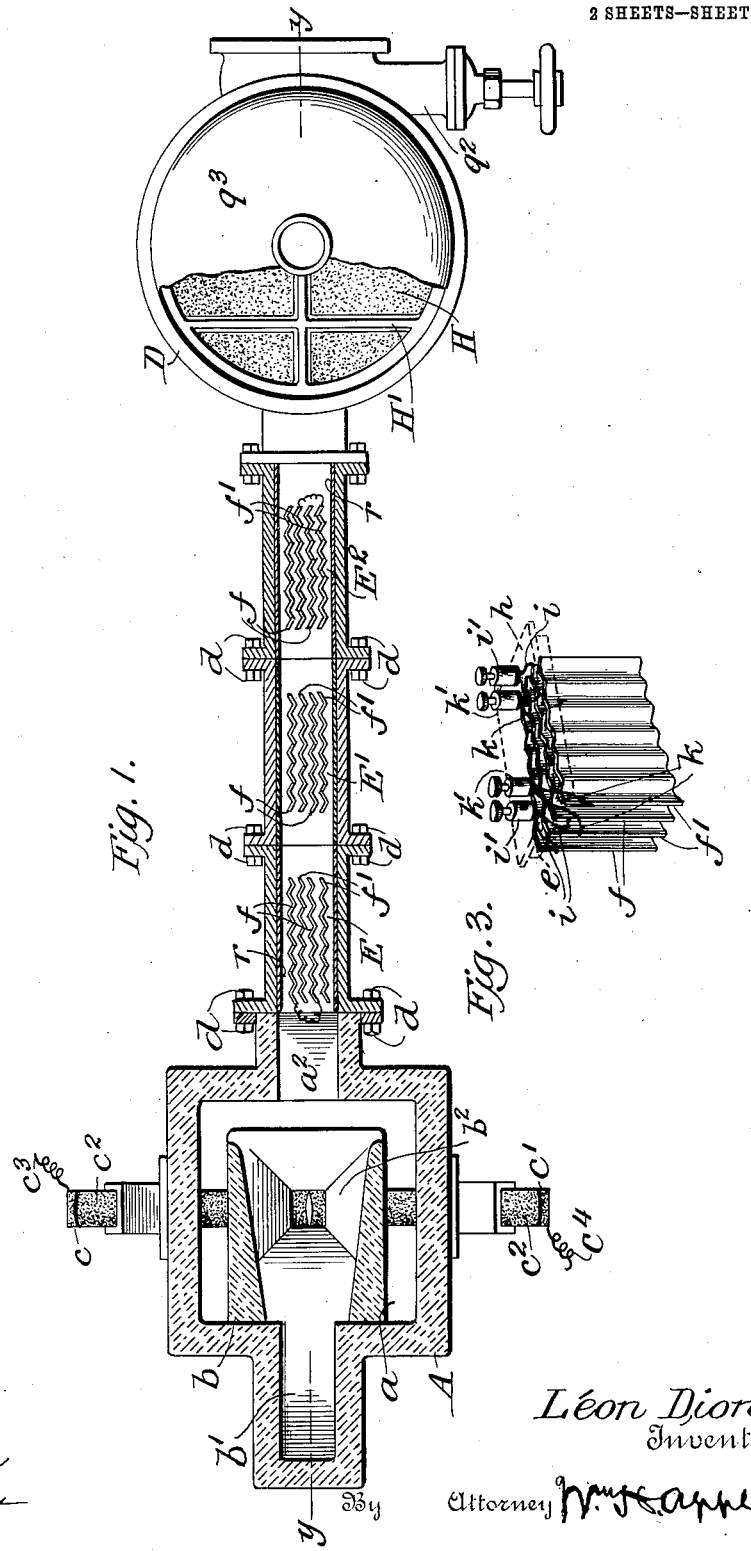

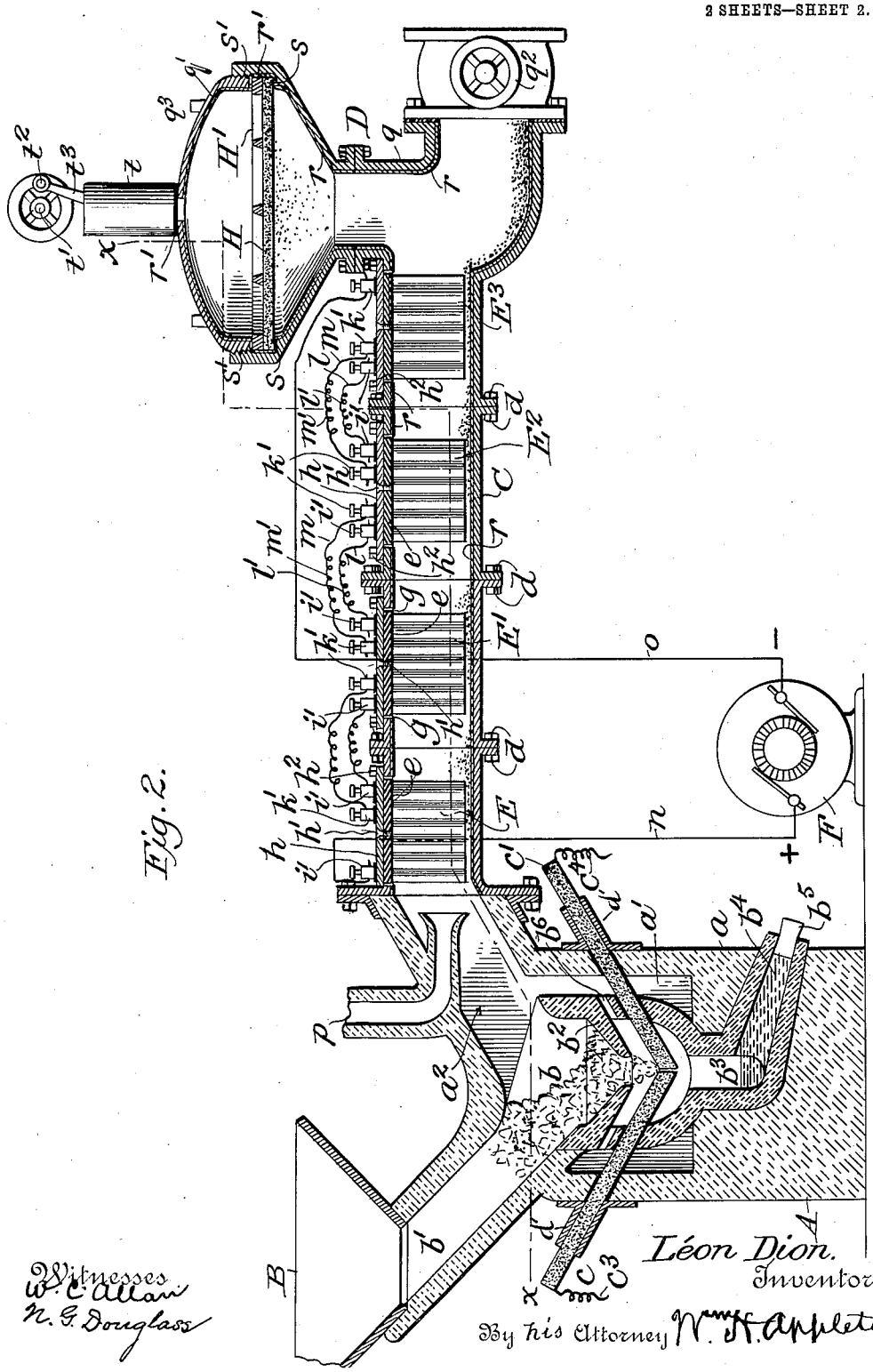

UNITED STATES PATENT OFFICE.

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

APPARATUS FOR RECOVERING METALS FROM ORES AND OTHER SUBSTANCES.

No. 925,626.        Specification of Letters Patent.      Patented June 22, 1909.

Application filed March 4, 1904. Serial No. 196,559.

*To all whom it may concern:*

Be it known that I, LÉON DION, a citizen of the United States, and a resident of the borough of Manhattan, in the city, county, and State of New York, have invented certain new and useful Improvements in Apparatus for Recovering Metals from Ores and other Substances, of which the following is a specification.

In the treatment of ores and other substances to recover or reclaim the metals contained in them, a large percentage of the metal passes off, as is well known, in the form of fumes, gases or vapors, when the ores or other substances containing them are subjected to the required heat to fuse them. The metal or metals thus carried off in the shape of fumes, gases or vapors I have discovered may be concentrated or condensed, and thereby recovered or reclaimed, by subjecting these latter to the action of an electric current supplied through appropriate electrodes, the result of which I have found has been to cause the molecules or other particles of metal contained in or forming the fumes, gases or vapors of each to cohere and form masses of appreciable size, which are then thrown down or precipitated by the action of gravity or otherwise and may be recovered in that form. In thus treating these ores and other substances I have also found that the strength of the electric current necessary to the concentration or consolidation of the particles or molecules of one metal may be greater or less than that required to concentrate or consolidate the particles or molecules of another, as, for instance, the strength of the current necessary to recover the particles of gold may be greater than that required to concentrate or consolidate the particles of silver, and so on. In the treatment of ores or other substances containing a diversity of metals, I accordingly avail of this difference in the strength of current required to concentrate the different materials, as well also as of the difference in the precipitating properties of different materials, to not only concentrate and consolidate the particles or molecules of each into masses of appreciable size, but also to segregate the particles of one metal from the particles of another or others.

The object therefore of my invention is to provide means whereby the operation thus outlined may be carried into effect; and to this end the invention consists, first, in the means whereby the fumes, gases or vapors are arrested and concentrated or reclaimed; second, in the means whereby the fumes, gases or vapors arising from the furnace or other fusing apparatus are so directed or guided as to be brought into contact with the concentrating mechanism; and third, in various other constructions and arrangements of parts, all as will hereinafter more fully appear.

Referring to the accompanying drawings, which form a part of this specification, Figure 1, is a plan, partly in horizontal section on the line $x\,x$ of Fig. 2, of an apparatus embodying one form of my invention; Fig. 2, a longitudinal vertical section of the same, taken in the plane $y\,y$ of Fig. 1, showing the casing surrounding the hand-hole and the dynamo in side elevation, and Fig. 3, an isometric projection of one of the groups of electrodes, with portions of its supporting plates broken away, detached.

In all of the figures, like letters of reference are employed to designate corresponding parts.

A indicates a furnace, and B a hopper or receptacle to which the ores or other materials to be treated are or may be supplied.

The furnace A is or may be of any ordinary or preferred construction, but in the form of the invention which I have selected for the purpose of illustration it is of the electric type, and is constructed with a suitable base $a$, which is provided with a rectangular or other appropriately shaped chamber $a^1$, and has arranged therein a bowl or crucible $b$. As thus arranged, this bowl or crucible is connected with the hopper or receptacle B, through the intervention of an appropriate chute-way $b^1$, and receives in its lower portion the inner ends of the electrodes $c\,c^1$, which project therein. These electrodes may be constructed in various forms. In the drawings however I have shown them as made in the form of plates, with the upper surface of each provided with a shallow circular groove $c^2$, extending longitudinally of the same, as shown in Fig. 1. In some instances a plurality of pairs of these electrodes may be employed, in which cases the pairs will be preferably disposed the one above the other, and will act successively upon the ores or other materials as they pass downward between them. In the present instance however, I have shown but a single pair, and these are so disposed that they extend inwardly and downwardly through the walls of the base $a$ and through the walls of the bowl or crucible $b$, with their inner ends in close relationship, but at a short distance apart, in which positions they are supported by suitable holders $d^1$, secured to the outer walls of the base $a$ or otherwise, with the electrodes properly insulated from the base and crucible, as is common to furnaces of this class as heretofore constructed. With the electrodes $c$ and $c^1$ thus disposed, they are connected with a dynamo or other appropriate source of electric supply (not shown) through suitable conductors $c^3$ $c^4$, and receive upon their inner ends the ores or other materials supplied from the hopper or receptacle B, through the chute-way $b^1$, and which, in passing downward from the chute-way, is deflected inward over their inner ends by means of an inwardly and downwardly extending flange $b^2$, formed on or secured to the interior of the bowl or crucible $b$, as shown. In being thus subjected to the action of the electrodes $c$ and $c^1$, the ores or other materials falling upon them are fused by the action of the electric current, and, passing downward between them in a molten condition, are received within a reservoir or receptacle $b^3$, with which the lower portion or bottom of the bowl or crucible $b$ is provided, and which is or may be equipped with a suitable discharge orifice $b^4$ that extends to the outside of the base $a$, and is or may be provided with a suitable plug or other convenient means $b^5$ whereby it may be opened and closed, to permit of the drawing off or the storing up of the molten contents of the reservoir or receptacle $b^3$ as may be desired.

While the ores and other substances are being thus fused and falling into the reservoir or receptacle $b^3$, the fumes, vapors or gases arising from the molten metal or metals contained in it or them, or resulting from its or their fusion, will ascend from the electrodes $c$ and $c^1$, and, passing upward therefrom, will escape through the orifice $b^6$ into the chamber $a^1$, whence they will pass upward through the passage-way $a^2$, formed in the furnace A, to the trunk-like chamber C, where the concentration and recovery of the metal or metals with which they are laden, or of which they are composed, will be effected. In the construction of this trunk-like chamber C any appropriate form in cross-section may be adopted, and the same made continuous throughout or built up from sections as preferred. In the form of the invention which I have selected for the purpose of illustration however, it is constructed in rectangular form in cross-section, and is made up from a number of sections united at their ends by bolts $d$, with one of the ends of the chamber connected with the walls of the passage-way $a^2$, and the other with a vessel or receptacle D. With the trunk-like chamber C constructed as thus described, it receives the means by which the concentration and recovery of the metal or metals from the fumes, gases or vapors is effected. These means consist of a current or currents of electricity, which is or are supplied through appropriate electrodes connected with a dynamo or other source of electric supply, and which acting upon the fumes, gases, or vapors, as they pass between them in traveling along the chamber C, causes the molecules or particles of the metal containing them, when composed of a single metal, or the molecules or particles of each, when composed of a plurality of metals, to be mutually attracted and thereby to cohere into masses of appreciable size. The electrodes by means of which the current or currents of electricity may be thus applied may be constructed in various forms. In the drawings however I have shown each group as made up from a number of corrugated sheets of metal or other material of the requisite kind or kinds disposed in parallel relationship, and secured at one of their edges to a base plate $e$, which is or may be formed of some non-conducting material, with the positive or + members $f$ arranged between, and in alternation with, the negative or − elements $f^1$ thereof. As thus constructed, these electrodes extend down into the trunk-like chamber C to near the bottom thereof, through suitable orifices $g$ formed in its upper walls, in which positions they are held in approximately parallel relationship to its side walls by plates $h$, to which they are secured by suitable screws $h^1$, and which in turn are secured to the upper surface of the trunk-like chamber C by appropriate screws $h^2$. When but a single metal is to be concentrated or recovered from the fumes, vapors or gases arising from the molten metal, then only a single group of these electrodes will be required. On the other hand, when a plurality of metals are to be concentrated and recovered therefrom, then a plurality of groups of these electrodes will be necessitated, and the metals or materials out of which each of the groups are formed will be of the requisite character and the current employed of the appropriate strength to effect the concentration and recovery of the particular metal upon which they are designed to thus operate. In the drawings, however, I have shown four of these groups, of which the first, or group E, is designed to act upon and concentrate one metal, as, for instance, gold; and, in this case, the positive electrode will be made of zinc and the negative electrode of German silver, or both electrodes may be made of gold; the next, or group $E^1$, to act upon and concentrate another metal, as, for instance, silver, and in such case both the positive and negative electrodes will be made of silver; the third, or group E², to act upon and concentrate still another, as, for instance, copper, and in this case a zinc positive and copper negative electrode may be made use of, and so on, the fourth or group E³ acting upon and concentrating a still further metal, as, for instance, platinum, in which case both the positive and negative electrodes will or may be constructed of platinum; but this arrangement is only illustrative, and a greater or less number of groups may be employed, as a greater or less number of metals are to be concentrated and recovered, and a single group, or a plurality of groups, may be made use of in connection with each metal, as preferred.

With the electrodes constructed as above explained, the positive or + elements $f$ of each group are preferably connected at each of their ends by a suitable conductor $i$, which is likewise connected with a binding post $i^1$. In like manner the negative or − elements $f^1$ of each group are similarly connected at each of their ends by a conductor $k$, which, in turn, is also connected with a binding post $k^1$; and as thus joined the various groups may be connected with a dynamo F, or other source of electric supply, either in multiple or in serial circuit, as preferred. In the drawings however, I have shown them connected therewith in serial circuit, the positive elements $f$ of all the groups being connected by suitable conductors $l$, while the negative elements $f^1$ of all the groups are connected by similar conductors $m$, with the positive elements of group E, connected with the positive pole of the dynamo F, through a conductor $n$, and the negative elements of the group E³ connected with the negative pole thereof, through a conductor $o$. As thus connected the fumes, gases or vapors arising from the molten metal in the bowl or crucible $b$ will pass through the chamber from one end thereof to the other; and in order to insure of their thus traveling along the same, I make use of an inlet pipe $p$ through which a current of air may be supplied from a blower or other appropriate source. In thus passing through the trunk-like chamber C, these fumes, gases or vapors will contact with the surfaces of the electrodes themselves, or be forced across the lines of force extending between them, with the consequent result that the metals appropriate to and acted upon by the different electrodes will be concentrated into particles or masses of appreciable size, and either made to adhere to the negative or − electrodes $f^1$, or thrown down in that form by the joint action of gravity and of the current of air projected against them through the inlet pipe $p$.

When a number of metals are to be concentrated or recovered, and a plurality of groups of electrodes are employed for the purpose, the variation in the strength of the current supplied to the different electrodes may be effected by arranging each of these groups in multiple circuit with a separate dynamo having the requisite strength of output. On the other hand, when a number of metals are to be concentrated and recovered, and a plurality of groups of electrodes are employed in serial circuit with a single dynamo for the purpose, then this variation in the strength of the current appropriate to each group may be effected by introducing into the conductors $l$ and $m$ between the different groups, suitable resistances $l^1$ and $m^1$ respectively, as shown. The strength of the current employed in the concentration of the various metals may be varied within wide limits, and may extend from a current of one volt upward. With the strength of one volt, some concentration may be effected, but the amount of concentration may be increased by increasing this voltage, and with a strength of current of 110 volts a highly efficient concentration may be accomplished. From the chamber C the metal or metals thus concentrated and recovered, will be carried forward by the action of the current of air and be deposited in the vessel D. This vessel D, which is or may be of any approved form, is here shown as constructed with a lower contracted body portion $q$, and an upper enlarged portion $q^1$. Of these, the lower contracted portion $q$ extends downward a short distance below the adjacent end of the trunk-like chamber C, whereby to form a receptacle for the metal or metals concentrated and thrown down by the electrodes, and is curved outward at approximately right angles, with its lower outer end provided with a suitable gate $q^2$, by means of which it may be closed, and access afforded to its interior when desired, to remove the metal or other materials therefrom. The upper enlarged portion $q^1$, on the other hand, is preferably formed with a detachable top $q^3$, and receives between this top and its own upper end a suitable filter or screen H, which extends across transversely of its interior. This filter or screen may be of any suitable material, but, as here shown, it is composed of a sheet of carbon, and, secured to, or mounted upon, a suitable frame $H^1$, is supported upon a ledge $s$, formed by counterboring the upper end of the upper enlarged portion $q^1$, or otherwise, being held clamped in that relationship by the detachable top $q^3$ which is secured within the upper end of the enlarged upper portion by appropriate screw threads $s^1$, with which the parts $q^1$ and $q^3$ are respectively provided. With the vessel D constructed as thus described, the upper detachable portion $q^3$, is or may be provided with an air pump by means of which the air or gases contained within the vessel D may be exhausted, and an air or gas current thereby induced through the chamber C.

This pump is or may be of the usual construction, and is shown as provided with an appropriate cylinder $t$, within which is arranged a suitable piston, that is operated from an appropriate shaft $t^1$, through the intervention of a crank $t^2$ and connection $t^3$. As thus equipped the exhaustion of the air and gases passing to the vessel D through the chamber C is effected, and any particles of metal held in mechanical suspension therein separated out from them and arrested by the filter or screen H, from the surface of which it may be afterward removed by scraping or otherwise. While thus the concentration and recovery of the metal or metals arising in the shape of fumes, gases or vapors from the molten mass may be thus effected by the group or groups of electrodes and the filter or screen H, the loss of the electric current by conduction through the chamber C and vessel D is prevented by an insulating lining $r$, with which their interiors are respectively provided. In like manner the escape of this current through the filter or screen H and the air pump is also prevented by suitable insulating material $r^1$, such, for instance, as glass interposed between them and the parts of the vessel D in or upon which they are supported.

With the parts constructed and organized as above explained, and an appropriate current or currents of electricity supplied to the different electrodes, the operation of the apparatus is as follows: The ore or other material to be treated is supplied to the hopper or receptacle B, whence it passes downward through the chute-way $b^1$ into the bowl or crucible $b$, where it falls upon the electrodes $c$ $c^1$ and, becoming fused thereby, the molten material resulting therefrom falls downward into the receptacle $b^3$, from which it may be removed from time to time through the discharge orifice $b^4$. In being thus fused a portion of the metal or metals contained in the ores or other materials will arise in the form of fumes, gases or vapors, and, passing outward through the orifice $b^6$ into the chamber $a'$, will travel upward through the passageway $a^2$ and through the trunk-like chamber C to the vessel D. In thus traveling through the chamber C these fumes, gases or vapors will be either brought directly into contact with the elements of the different electrodes, or else be carried across the lines of force extending between them, with the consequent result that the metal or metals carried by them will be concentrated or consolidated, and either deposited upon the appropriate elements of the electrode or electrodes, or else be precipitated in the form of particles or masses of appreciable size, whence they will be carried forward into the vessel D, from which they may be recovered from time to time by opening the gate $q^2$ in its lower end. If the fumes, gases or vapors thus treated contained but a single metal, only the electrodes that are formed of the materials appropriate to that metal will act upon it to concentrate and recover it. On the other hand, if they contain or are formed from a number of metals, then the electrodes which are formed of materials that are appropriate to each, and are energized by the current of electricity of the proper strength, will act upon its respective metal and thereby concentrate and recover it, allowing the other or others to pass to its or their appropriate electrodes for concentration and recovery by them, and so on. Thus, as will be seen, by making the electrodes of materials that are appropriate to and active upon the different metals contained in or forming the fumes, gases or vapors treated, and employing an electric current of the requisite strength for each, not only may the different metals contained in these fumes, gases or vapors be concentrated, but the particles or masses of each, thereby segregated from the other or others, while any particles that may be concentrated and held in mechanical suspension, will be separated out therefrom and arrested by the filter or screen H, as the fumes, gases, or vapors are drawn upward through the same by the suction pump, and these particles also recovered thereby.

While in the drawings I have shown the current for energizing the electodes E, $E^1$, $E^2$, $E^3$, as supplied from an ordinary dynamo, I do not limit myself thereto, as it is obvious that I may employ in place thereof any other source of electric supply, and may make use of either frictional, voltaic or any other form of current for energizing them, as preferred. Again, while in the drawings I have shown, and in the foregoing described, a form of electric furnace which may be conveniently employed, I make no claim to such furnace herein, as the same forms the subject of a separate application which was filed in the United States Patent Office April 30th, 1906, and serially numbered 314,337, the same being a division of the present application Again, while in the foregoing I have set forth the materials which may be employed in the construction of the electrodes, I do not restrict myself thereto, but reserve to myself the right to employ any other materials therefor which may be adapted to the purpose.

Having now described my invention, and specified certain of the ways in which it is or may be carried into effect, I claim and desire to secure by Letters Patent of the United States,

1. An apparatus for concentrating and recovering the metal or metals from the fumes, gases or vapors arising from the fusing of such metals, comprising a chamber through which these fumes, gases or vapors are passed, coöperating positive and negative electrodes arranged in such chamber between which such fumes, gases or vapors are caused to travel and by which they are subjected to the action of an electric current, means by which a current of electricity may be supplied to such electrodes, and a vessel or receptacle into which the fumes, gases or vapors are passed after parting with such metal or metals, and from which the residue may be discharged, substantially as described.

2. The combination, with a chamber adapted to receive the fumes, gases or vapors arising from molten metal or metals, electrodes between which these fumes, gases or vapors are caused to pass arranged in such chamber, and means for supplying a current of electricity to said electrodes, of a vessel into which the residue of the fumes, gases or vapors are delivered after passing between the electrodes, a filter arranged in such vessel and means by which this residue of the fumes, gases or vapors are forced through such filter and discharged, substantially as described.

3. The combination, with a furnace for receiving and fusing ores and other substances, a chamber connected with such furnace and adapted to receive the fumes, gases or vapors arising from the metal or metals contained in such ores and other substances, electrodes between which these fumes, gases or vapors are caused to pass arranged within such chamber, and means for supplying these electrodes with a current of electricity, of a vessel into which the residue of these fumes, gases or vapors are delivered after passing between the electrodes, a filter arranged in said vessel, and means whereby the residue of the fumes, gases or vapors delivered to the vessel are forced through such filter and discharged, substantially as described.

4. The combination, with a chamber adapted to receive the fumes, gases or vapors arising from molten metal or metals, groups of electrodes between each of which groups these fumes, gases or vapors are caused to pass arranged in such chamber and each constructed of materials that are active upon a different metal, and means for supplying a current of electricity to each of such groups, of a vessel into which the residue of the fumes, gases or vapors are delivered, after passing between the groups of electrodes, and means whereby this residue may be discharged from such vessel, substantially as described.

5. The combination, with a chamber adapted to receive the fumes, gases or vapors arising from the fusion of metal or metals, groups of electrodes between each of which groups these fumes, gases or vapors are caused to pass arranged within such chamber with each of these groups constructed of materials that are active upon a different and a particular metal, and means for supplying a current of electricity of a different strength to each of these groups, of a vessel into which the residue of the fumes, gases or vapors are delivered after passing between the different groups of electrodes, substantially as described.

6. The combination, with a chamber adapted to receive the fumes, gases or vapors arising from the fusion of metal or metals, groups of electrodes between each of which groups these fumes, gases or vapors are caused to pass arranged within such chamber, and a source of electric supply, of electrical connections between such groups of electrodes and the source of electric supply and between the different groups, and resistances interposed in the connections between the groups, substantially as described.

In testimony whereof I have hereunto set my hand this 27th day of February, 1904.

LÉON DION.

Witnesses:
WM. H. APPLETON,
R. F. SWEENY.